United States Patent Office  3,573,289
Patented Mar. 30, 1971

3,573,289
CATIONIC METHINE COMPOUNDS
James M. Straley and John G. Fisher, Kingsport, Tenn., assignors to Eastman Kodak Company, Rochester, N.Y.
No Drawing. Filed Oct. 27, 1967, Ser. No. 678,514
Int. Cl. C09b 23/00
U.S. Cl. 260—240      8 Claims

ABSTRACT OF THE DISCLOSURE

Methine compounds prepared by condensing a 5-formylthiazole with a 2-methyleneindoline are useful as dyes for acrylic, modacrylic and acid-modified polyester textile materials.

---

This invention relates to certain novel methine compounds and to the use of such compounds as dyes for acrylic and modacrylic textile fibers, yarns and fabrics.

The novel methine compounds of the invention have the general formula (I)
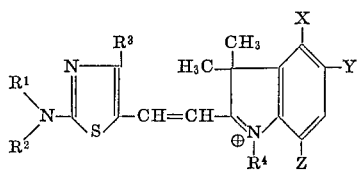

wherein $R^1$, $R^2$ and $R^3$ are the same or different and each represents hydrogen, lower alkyl, phenyl, or phenyl substituted with lower alkyl, lower alkoxy, or halogen; or $R^1$ and $R^2$, together with their common nitrogen atom, represent pyrrolidino, lower alkylpyrrolidino, morpholino, lower alkylmorpholino, piperidino, lower alkylpiperidino, 4 - thiomorpholine - 1,1 - dioxide, 1,2,3,4-tetrahydroquinolino, or lower alkyl-1,2,3,4-tetrahydroquinolino;
$R^4$ represents lower alkyl or benzyl;
X and Y, when taken collectively, represent 1,3-butadien-1,4-ylene, or, when taken singly, X represents hydrogen and Y represents hydrogen, nitro, lower alkylsulfonyl, lower alkoxy, halogen, or lower alkoxycarbonyl;
Z represents hydrogen or lower alkoxy, and $A^\ominus$ represents $Cl^-$, $Br^-$ or $I^-$.

The methine compounds of the invention give violet to red dyeings when applied to acrylic, modacrylic, and acid-modified polyester textile fibers, yarns and fabrics by conventional means.

Typical of the alkyl and phenyl groups represented by each of $R^1$, $R^2$ and $R^3$ are methyl, ethyl, propyl, isopropyl, butyl, phenyl, lower alkyl-substituted phenyl, e.g. p-tolyl, p-ethylphenyl, lower alkoxy-substituted phenyl, e.g. p-anisyl, a halogenophenyl group, e.g. p-chlorophenyl, o,p-dibromophenyl and the like. As used herein "lower" refers to an alkyl moiety having from 1 to about 4 carbon atoms. The alkyl groups represented by $R^1$ are also representative of the alkyl groups which $R^4$ can represent.

The heterocyclic groups represented collectively by $R^1$ and $R^2$, with their common nitrogen atom, include pyrrolidino, morpholino, piperidino, N-thiomorpholine-1,1-dioxide, 1,2,3,4 - tetrahydroquinolino and the lower alkyl derivatives thereof, e.g. 3-methylmorpholino, 3-ethylpiperidino, 3-propylmorpholino, 4-butylpiperidino, 2,7-dimethyl-1,2,3,4-tetrahydroquinolino, 2,2,4,7-tetramethyl-1,2,3,4-tetrahydroquinolino, etc.

Typical of the substituents represented by Y include nitro, methylsulfonyl, ethylsulfonyl, propylsulfonyl, butylsulfonyl, methoxy, ethoxy, propoxy, butoxy, chloro, bromo, fluoro, methoxycarbonyl, ethoxycarbonyl, propoxycarbonyl, butoxycarbonyl and the like. As mentioned hereinabove, X and Y can collectively represent a 1,3-butadien-1,4-diyl group which, with the carbon atom to which X and Y are attached, forms a fused benzene ring. The alkoxy groups set forth above are also illustrative of the alkoxy groups that Z can represent.

A particularly preferred group of the novel compounds of the invention have the formula

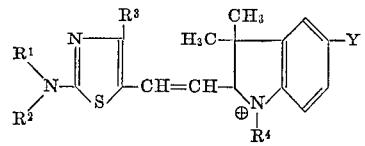

wherein $R^1$ and $R^2$ are the same or different and each, when taken singly, represents lower alkyl, phenyl, or lower alkylphenyl, or when taken collectively with the nitrogen atom to which they are attached, $R^1$ and $R^2$ represent morpholino or piperidino;
$R^3$ represents phenyl;
$R^4$ represents methyl; and
Y represents hydrogen or halogen.

The methine compounds are prepared according to well-known procedures. Thus, thiazolealdehyde having the formula (II)
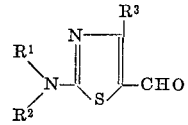

is reacted with an appropriately substituted Fischer's base having the formula (III)
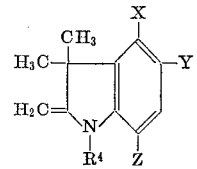

in acetic acid at steam bath temperatures. Acids other than acetic acid may be used as the reaction medium.

The Fischer's base compounds are well-known and are described in the literature. The thiazolealdehydes are prepared by the well-known Vilsmeir reaction.

Representative thiazoealdehydes utilized in the preparation of the methine compounds of the invention include 2-N-(methyl)anilino-5-formyl-4-phenylthiazole,
2-amino-5-formyl-4-phenylthiazole,
2-dimethylamino-5-formyl-4-phenylthiazole,
2-morpholino-5-formyl-4-phenylthiazole,
2-(N-methyl-m-toluidino)-5-formyl-4-phenylthiazole,
2-N-(methyl)anilino-5-formylthiazole,
2-N-(methyl)anilino-5-formyl-4-methylthiazole,
2-N-(propyl)anilino-5-formyl-4-phenylthiazole,
2-N-(methyl)anilino-5-formyl-4-phenylthiazole,
2-(N-butyl-N-ethyl)amino-5-formyl-4-propylthiazole,
2-m-propylanilino-5-formyl-4-butylthiazole,
2-(N-butyl)anilino-5-formyl-4-tolylthiazole,
2-p-toluidino-5-formyl-4-p-chlorophenylthiazole,
2-(N-propyl)-m-anisidino-5-formylthiazole,
2-m-chloroanilino-5-formyl-4-p-bromophenylthiazole,
2-m-butylanilino-5-formyl-4-butoxyphenylthiazole, etc.

Appropriate Fischer's bases which are utilized in the preparation of the methine compounds of the invention include 1,3,3-trimethyl-2-methyleneindoline,
methyl-1,3,3-trimethyl-2-methyleneindoline-5-carboxylate,
1,3,3-trimethyl-3-nitro-2-methyleneindoline
1,3,3-trimethyl-4,5-chlorobenzo-2-methyleneindoline,
1,3,3-trimethyl-7-methoxy-2-methyleneindoline,
1,3,3-trimethyl-5-methylsulfonyl-2-methyleneindoline,
1,3,3-trimethyl-5-methoxy-2-methyleneindoline, etc.

Examples of the anions represented by A include Cl⁻, Br⁻, I⁻. The anion does not affect the utility of the methine cations of the invention as dyes nor does it affect the dye affinity of the cations for polyacrylonitrile textile materials. When the compounds are used to dye polyacrylonitrile textile material, the anion becomes associated with a positively charged ion derived from the polyacrylonitrile and is removed from the dye cation and polyacrylonitrile textile material, either in the dyebath or in a subsequent washing of the dyed polyacrylonitrile textile material. Since the cation of a cationic methine dye is responsible for the color of the compound and the particular anion associated with the cation is not important, the novel methine cations of the inventions are described in the example without being associated with any anion.

The following examples will serve to further describe and illustrate our invention.

PREPARATION OF THIAZOLEALDEHYDES

Example 1

Preparation of 2-N-methylanilino-5-formly - 4 - phenylthiazole.—A solution of 26.6 g. of 2-N-(methyl)anilino-4-phenylthiazole in 40 ml. of dry dimethylformamide is treated with 10 ml. of POCl₃, keeping the temperature at 15–20° C. during the addition by ice cooling. When the addition is complete the reaction mixture is heated at 80–90° C. for 1½ hr. It is then drowned into ice and water and made alkaline by addition of 50% NaOH solution. The product is collected, washed well with water and dried at room temperature. The product which is obtained in 93% yield melts at 149–151° C. and has the formula

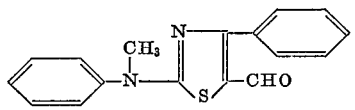

Example 2

Preparation of 2-amino-5-formyl-4-phenylthiazole.—This compound is prepared exactly as described in Example 1, using 17.6 g. of 2-amino-4-phenylthiazole. The product in this case is recrystallized from ethanol to give a 70% yield melting at 136–138° C. It has the formula

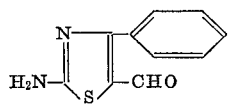

PREPARATION OF METHINE CATIONS

Example 3

A solution of 1.5 g. of the aldehyde of Example 1 and 0.86 g. of 1,3,3-trimethyl-2-methylene indoline in 8 ml. of acetic acid is heated in the steam bath for 4 hr. This red solution is drowned in water containing KI and the precipitated solids are collected and washed with water. The following cation, which imparts bluish-red shades to acrylic fibers, is obtained.

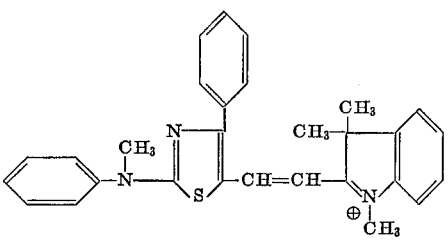

Example 4

A solution of 1.2 g. of 2-dimethylamino-5-formyl-4-phenylthiazole and 0.86 g. of 1,3,3-trimethyl-2-methylene indoline in 8 ml. of acetic acid is heated in the steam bath for 4 hr. The solution is drowned in water containing KI and the precipitated solids are collected and washed with water. The cation obtained imparts bluish-red shades to acrylic fibers and has the formula

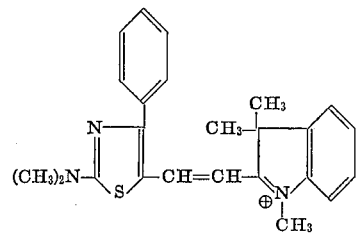

Example 5

A solution of 1.2 g. of the aldehyde used in Example 4 and 0.96 g. of methyl-1,3,3-trimethyl - 2 - methylene-indoline-5-carboxylate in 10 ml. of acetic acid is heated in the steam bath for 4 hr. The solution is drowned in water containing NaCl and ZnCl₂. A methine cation of the following structure is isolated. It imparts violet shades to acrylic and modacrylic fibers.

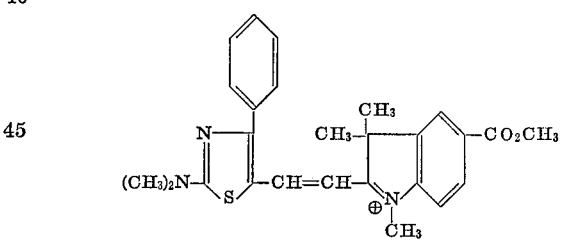

Example 6

A solution of 1.3 g. of 5-formyl-2-morpholino-4-phenylthiazole and 0.86 g. of 1,3,3-trimethyl-2-methyleneindoline in 8 ml. of acetic acid is heated in the steam bath for 4 hr. The solution is drowned in water containing KI and the precipitated solids are collected and washed with water. The cation obtained imparts bluish-red shades to acrylic fibers and has the formula

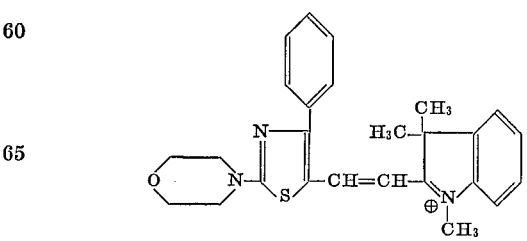

Example 7

A solution of 1.5 g. of 5-formyl - 2 - (N-methyl-m-toluidino)-4-phenylthiazole and 0.86 g. of 1,3,3-trimethyl-2-methyleneindoline in 8 ml. of acetic acid is heated in the steam bath for 4 hr. The solution is drowned in water containing KI and the precipitated solids are collected and washed with water. This cation imparts bluish-red shades to acrylic fibers and has the formula

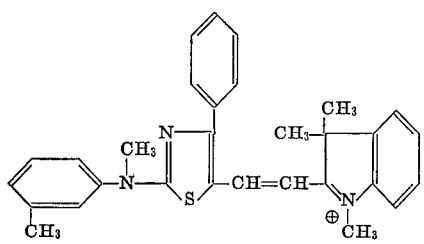

The methine cations, set forth in Table 1 below, corresponds to general Formula I and are prepared as illustrated in Examples 1 through 7.

from the group consisting of (1) homopolymers of acrylamidic monomers of the formula

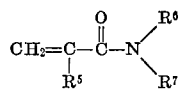

wherein $R^5$ is selected from the group consisting of hydrogen and methyl, and $R^6$ and $R^7$ are selected from the group consisting of hydrogen and alkyl groups of 1–6 carbon atoms, (2) copolymers consisting of at least two of said acrylamidic monomers, and (3) copolymers consisting of at least 50% by weight of at least one of said acrylamidic monomers and not more than 50% by weight of a polymerizable monovinyl pyridine monomer.

Another type of modacrylic polymer that can be dyed with the compounds of the invention is an acetone solu-

TABLE I

| Example No. | $R^1$ | $R^2$ | $R^3$ | $R^4$ | X | Y | Z | Color |
|---|---|---|---|---|---|---|---|---|
| 8 | —CH₃ | —CH₃ | —C₆H₅ | —CH₃ | H | —NO₂ | H | Violet. |
| 9 | —CH₃ | —CH₃ | —C₆H₅ | —CH₃ | H | —Cl | H | Reddish violet. |
| 10 | —CH₃ | —CH₃ | —C₆H₅ | —CH₃ | —CH=CH—CH=CH— | | H | Violet. |
| 11 | —CH₃ | —CH₃ | —C₆H₅ | —CH₃ | H | H | CH₃O— | Red. |
| 12 | —CH₃ | —CH₃ | —C₆H₅ | —CH₃ | H | CH₃SO₂— | H | Red-violet. |
| 13 | —CH₃ | —CH₃ | —C₆H₅ | —CH₃ | H | CH₃O— | H | Red. |
| 14 | H | H | —C₆H₅ | CH₃ | H | H | H | Red. |
| 15 | C₂H₅ | C₆H₅ | C₆H₅ | CH₃ | H | H | H | Bluish-red. |
| 16 | —CH₃ | —C₆H₅ | H | —CH₃ | H | H | H | Red. |
| 17 | —CH₃ | —C₆H₅ | —CH₃ | —CH₃ | H | H | H | Red. |
| 18 | —CH₃ | —C₆H₅ | —C₆H₅ | —CH₃ | —CH=CH—CH=CH— | | H | Violet. |
| 19 | —CH₃ | —C₆H₅ | —C₆H₅ | —CH₃ | H | —Cl | H | Bluish-red. |
| 20 | —C₃H₇ | —C₆H₅ | —C₆H₅ | —C₂H₅ | H | C₂H₅SO₂— | H | Red-violet. |
| 21 | p-C₂H₅-phenyl | H | C₆H₅ | Benzyl | H | C₂H₅O | C₂H₅O | Red. |
| 22 | C₄H₉ | C₂H₅ | C₃H₇ | Benzyl | H | C₃H₇SO₂ | CH₃O | Red. |
| 23 | Pyrrolidino | | —C₆H₅ | —CH₃ | H | H | H | Bluish-red. |
| 24 | N-thiomorpholine-1,1-dioxide | | —C₆H₅ | —CH₃ | H | H | H | Do. |
| 25 | 2,7-dimethyl-1,2,3,4-tetrahydroquinolino | | C₆H₅ | —CH₃ | H | H | H | Do. |

The compounds of the invention can be used for dyeing acrylic and modacrylic polymer fibers, yarns and fabrics giving a variety of fast violet to red shades when applied thereto by conventional dye methods. Acrylic textile materials are those which consist of at least 85% acrylonitrile and modacrylic textile materials are those consisting of at least 35% but less than 85% acrylonitrile. The compounds of the invention also give excellent dyeings on acid-modified acrylic fibers described in U.S. Patents 2,837,500, 2,837,501 and 3,043,811. The novel compounds can also be used to dye sulfonate modified polyester fibers such as are described in U.S. Patent 3,018,272. Examples of the textile materials that are dyed with the compounds of the invention are those sold under the trade names "Orlon," "Orlon 42," "Verel," "Acrilan," "Dynel," "Creslan" and "Dacron 64." In general, the compounds, when used as dyes on the described textile materials, exhibit improved fastness, for example, to washing, to alkaline perspiration, gas (atmospheric fumes) and sublimation.

Textile materials dyed by the compounds of the invention are characterized by containing at least about 35% combined acrylonitrile units and up to about 95% acrylonitrile units, and modified, for example, by 65-5% of vinyl pyridine units as described in U.S. Patents 2,990,393 (Re. 25,533) and 3,014,008 (Re. 25,539) or modified by 65-5% of vinylpyrrolidone units, for example, as described by U.S. Patent 2,970,783, or modified with 65-5% acrylic ester or acrylamide units as described in U.S. Patents 2,879,253, 2,879,254 and 2,838,470. Similar amounts of the other polymeric modifiers mentioned above are also useful. A preferred group of the copolymers readily dyeable with the dyes of the invention are the modacrylic polymers such as described in U.S. Patent 2,831,826 composed of a mixture of (A) 70–95% by weight of a copolymer of from 30–65% by weight of vinylidene chloride or vinyl chloride and 70–35% by weight of acrylonitrile, and (B) 30–5% by weight of a second polymer ble mixture of (a) 70–95% by weight of a copolymer of 30–65% by weight of vinylidene chloride and 70–35% by weight of acrylonitrile and (b) 30–5% by weight of an acrylamide homopolymer having the above formula wherein $R^5$, $R^6$ and $R^7$ are as described above. Specific polymers of that type contain 70–95% by weight of (a) a copolymer of from 30–65% by weight of vinylidene chloride and 70–35% by weight of acrylonitrile and (b) 30–5% by weight of a lower N-alkylacrylamide polymer such as poly-N-methacrylamide, poly-N-isopropylacrylamide and poly-N-tertiarybutylacrylamide.

The following example illustrates one way in which the compounds of the invention can be used to dye acrylonitrile polymer textile material.

Example 26

An amount of 0.1 gram of dye is dissolved by warming in 5 cc. of 2-methoxyethanol. A 2% aqueous solution of a non-ionic surfactant, such as Igepal CA (a polymerized ethylene oxide-alkylphenol condensation product), is added slowly until a fine emulsion is obtained and then the dye mixture is brought to a volume of 200 cc. with warm water. Five cc. of a 5% aqueous solution of formic acid or acetic acid are added and then 10 grams of fabric made from an acrylic fiber is entered and, in the case of "Orlon 42" acrylic textile material, the dyeing is carried out at the boil for one hour. In the case of materials made of "Verel" modacrylic fiber the dyebath temperature should not exceed 90° C. in order to avoid damage to the fiber. The dye material is then washed well with water and dried.

The invention has been described in considerable detail with particular reference to certain preferred embodiments thereof, but it will be understood that variations and modifications can be effected within the spirit and scope of the invention as described hereinabove and as defined in the appended claims.

We claim:
1. A methine compound having the formula

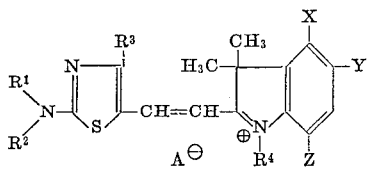

wherein
- R¹, R² and R³ are the same or different and each represents hydrogen, lower alkyl, phenyl or phenyl substituted with lower alkyl, lower alkoxy, or halogen; or R¹ or R², together with their common nitrogen atom, represent pyrrolidino, lower alkylpyrrolidino, morpholino, lower alkylmorpholino, piperidino, lower alkylpiperidino, 4-thiomorpholine-1,1-dioxide, 1,2,3,4-tetrahydroquinoline, or lower alkyl-1,2,3,4-tetrahydroquinolino;
- R⁴ represents lower alkyl or benzyl;
- X and Y, when taken collectively, represent 1,3-butadien-1,4-ylene, or, when taken singly, X represents hydrogen and Y represents hydrogen, nitro, lower alkylsulfonyl, lower alkoxy, halogen, or lower alkoxycarbonyl;
- Z represents hydrogen or an alkoxy group; and
- A⁻ represents Cl⁻, Br⁻, or I⁻.

2. A compound as defined in claim 1 wherein
- R¹ and R², taken singly, are the same or different and each represents lower alkyl, phenyl, or lower alkylphenyl, or, when taken with their common nitrogen atom, R¹ and R² collectively represent morpholino or piperidino;
- R³ represents phenyl or phenyl substituted with lower alkyl;
- R⁴ represents lower alkyl;
- X represents hydrogen;
- Y represents hydrogen, halogen, or lower alkoxycarbonyl; and
- Z represents hydrogen.

3. A compound as defined in claim 1 wherein
- R¹ and R² are the same or different and each represents lower alkyl, phenyl, or lower alkylphenyl;
- R³ represents phenyl;
- R⁴ represents methyl; and
- X, Y, Z represent hydrogen.

4. A compound as defined in claim 1 having the formula

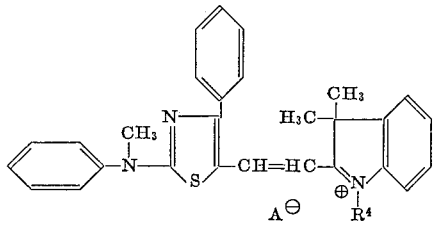

wherein A⁻ represents Cl⁻, Br⁻, or I⁻.

5. A compound as defined in claim 1 having the formula

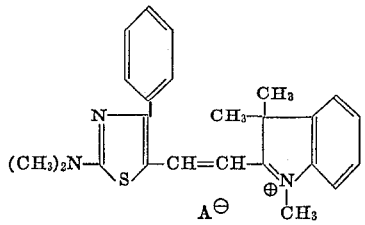

wherein A⁻ represents Cl⁻, Br⁻, or I⁻.

6. A compound as defined in claim 1 having the formula

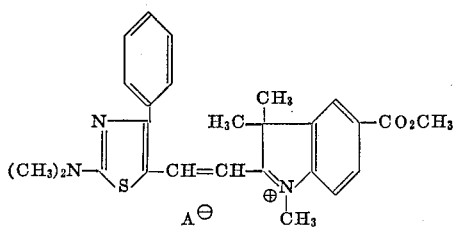

wherein A⁻ represents Cl⁻, Br⁻, or I⁻.

7. A compound as defined in claim 1 having the formula

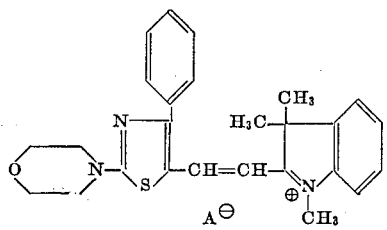

wherein A⁻ represents Cl⁻, Br⁻, or I⁻.

8. A compound as defined in claim 1 having the formula

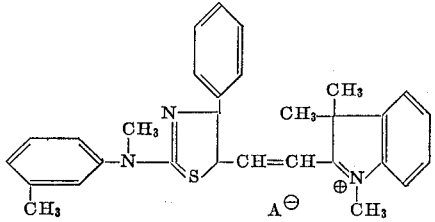

wherein A⁻ represents Cl⁻, Br⁻, or I⁻.

References Cited
UNITED STATES PATENTS

| | | | |
|---|---|---|---|
| 2,892,834 | 6/1959 | De Stevens et al. | 260—240.4 |
| 3,113,825 | 12/1963 | Streck | 260—240X |

JOHN D. RANDOLPH, Primary Examiner

U.S. Cl. X.R.

8—177; 260—240.1, 306.8, 326.11